United States Patent [19]

Benito Navazo

[11] Patent Number: 4,990,722
[45] Date of Patent: Feb. 5, 1991

[54] DUCTING FOR ELECTRICAL CONDUCTORS AND THE LIKE WITH STIFFENING ARRANGEMENT AND CORRESPONDING CLAMP

[75] Inventor: Juan M. Benito Navazo, Barcelona, Spain

[73] Assignee: Aparellaje Electrico S.A., Barcelona, Spain

[21] Appl. No.: 502,681

[22] Filed: Apr. 2, 1990

[30] Foreign Application Priority Data

Apr. 14, 1989 [ES] Spain .................................. 8901308

[51] Int. Cl.$^5$ ............................................ H02G 3/04
[52] U.S. Cl. ........................................ 174/97; 174/101
[58] Field of Search .................. 174/68.3, 72 A, 97, 174/101; 138/115, 116, 117

[56] References Cited

U.S. PATENT DOCUMENTS 3,403,220  9/1968  Riedel et al. .................. 174/101

FOREIGN PATENT DOCUMENTS 0054456  6/1982  European Pat. Off. ........... 174/101
2387407  11/1978  France ........................... 174/101
2401376  3/1979  France ........................... 174/101
2425603  12/1979  France ........................... 174/101

*Primary Examiner*—Laramie E. Askin
*Attorney, Agent, or Firm*—Staas & Halsey

[57] ABSTRACT

Ducting for electrical conductors with a stiffening arrangement formed by stiffening clamps, each of which comprises two or more parts between which there are transverse gaps separating aligned mutually inserted engaging members of both parts; each pair of adjacent parts are connected by lateral flaps attached to each part across a weakened area.

The ducting is of the type having a base wall, two side walls having top ends provided with coupling formations, and intermediate longitudinal partition members each provided with an upper terminal formation. The engaging members of the stiffening clamps engage the upper terminal formations of the intermediate partition members; and coupling parts on the ends of the stiffening clamps connect to the coupling formations on the top ends of the side walls.

11 Claims, 4 Drawing Sheets

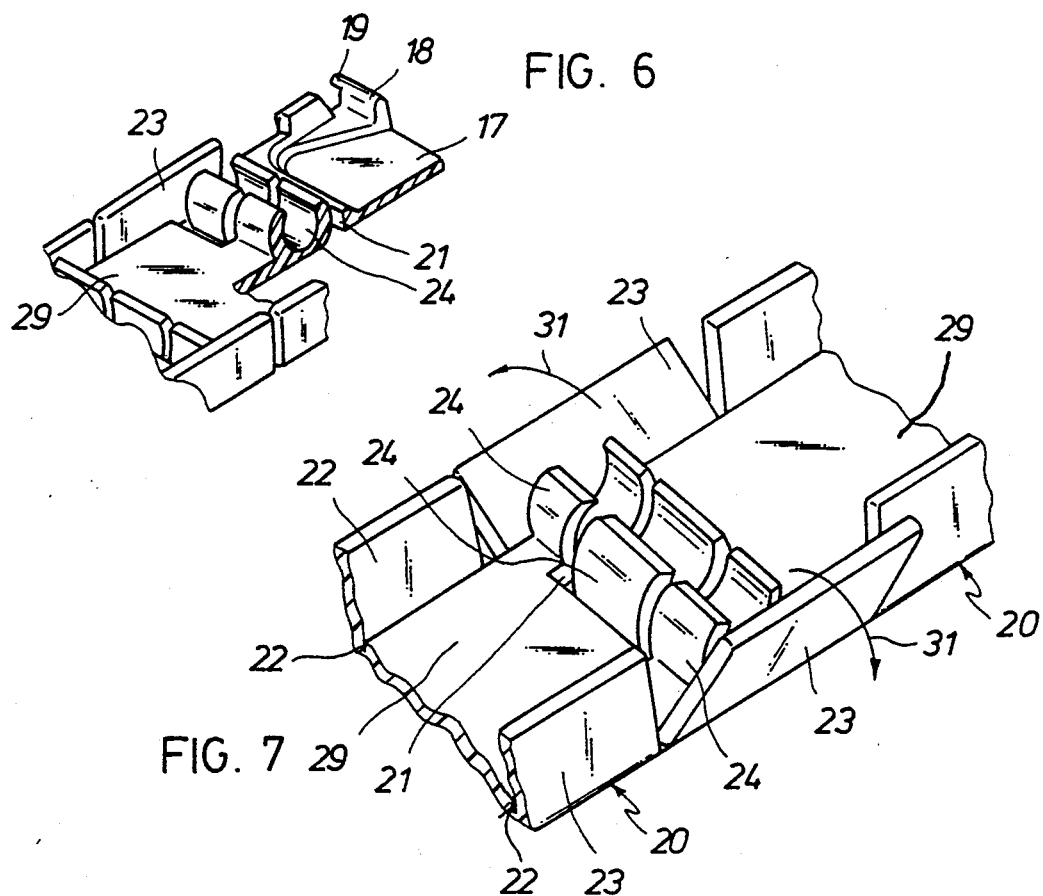
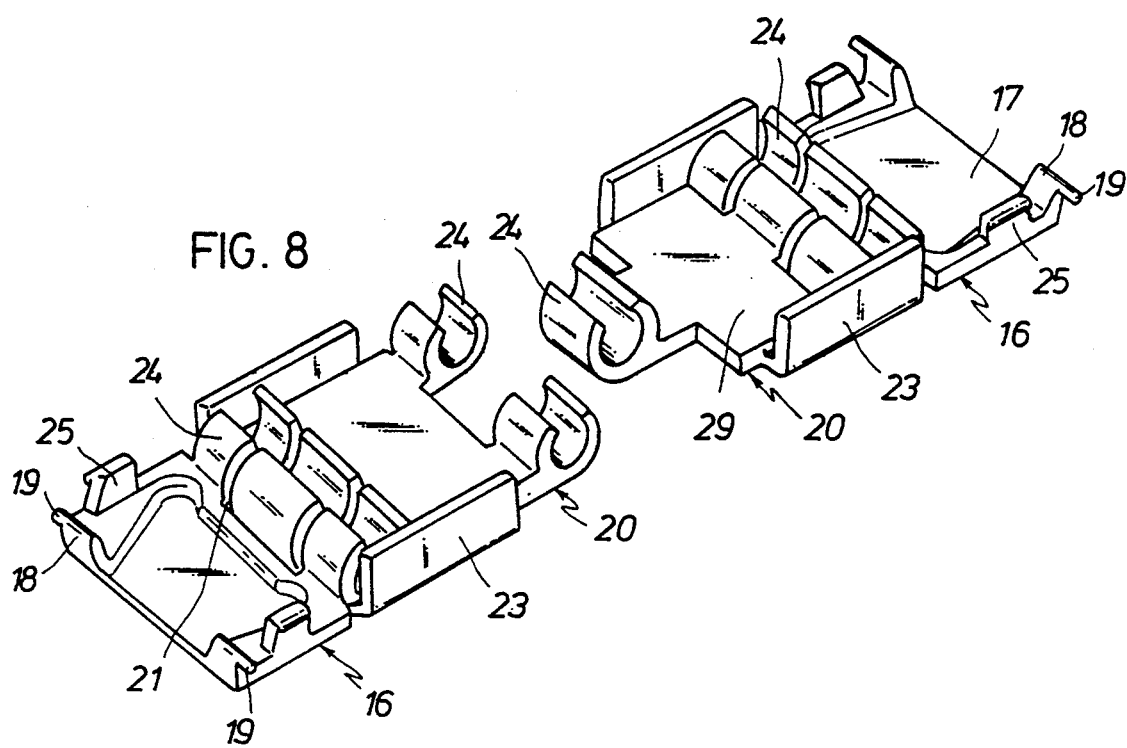

4,990,722

DUCTING FOR ELECTRICAL CONDUCTORS AND THE LIKE WITH STIFFENING ARRANGEMENT AND CORRESPONDING CLAMP

BACKGROUND OF THE INVENTION

1. Field of the Invention

The present invention relates to a ducting for electrical conductors and the like with a stiffening arrangement, the ducting being of the type comprising a base wall; two side walls having the top ends thereof provided with first coupling means; and intermediate longitudinal partition members each provided with an upper terminal formation. The stiffening arrangement comprises stiffening clamps provided at the ends thereof with second coupling means engageable with said first coupling means.

2. Description of the Prior Art

Several types of stiffening clamps for ducting are known and are distinguished more particularly by the way they are coupled to the said side walls and partition members. Thus, in French Pat. No. 2,387,407, the clamps are flattened members having at the ends thereof either hooks for insertion in the orifices in the edges of the side walls or arrow-headed protuberances for insertion in a slot formed along the edge of the partition members, with penetration in and sliding along from widened slot portions. They also comprise retaining stops, formed between two limiting projections, for coupling the clamp to intermediate separation walls. Nevertheless, for associating one side wall with the other or for associating one side wall with an intermediate separation wall, the above patent teaches the use of different clamps.

Also, European Pat. No. 0 054 456 teaches indivisible clamps having resiliently flexible end portions and lateral bosses for insertion in the orifices of the edges by compressing the resilient portions followed by expansion thereof. The drawback here is that the clamps are indivisible, requiring the manufacture and availability of a variety of types for different needs.

Also known is Spanish utility model No. 198,439 according to which a duct is provided with partition bars applicable at will and which, like the wall of the box, form free edges with elongate holes having a wide portion and a narrow portion, for insertion of clamps having at the ends thereof partly rectangular and partly arrow-headed projections on one side and further double arrow-headed intermediate projections, with a slot dividing them in two, which may be engaged in the orifices of the partition bars. The drawback in this case is that to couple the clamps they have to slide along the edges.

Also known is the French Pat. of addition No. 2,425,603, to French Pat. of No. 2,401,376, wherein reference is made to clamps provided with lateral bosses extending from the ends of an H-shaped body and which when the end portions are compressed, allow said bosses to be inserted in orifices in rows formed in respective edges of duct side or intermediate walls, said clamps having extension legs for mutual aligned assembly. This way of operation implies a constructive complication in view of the particular constitution of the clamps.

SUMMARY OF THE INVENTION

The present invention seeks to overcome the above drawbacks backs by making it possible to engage the clamps directly on the desired parts of the duct and furthermore by avoiding the need to manufacture a wide range of types thereof or accessories therefor.

The above aim is achieved with an arrangement of the type referred to above characterized in that said upper terminal formations have a constant section and each stiffening clamp comprises at least two parts, such that between every two adjacent parts there is a transverse gap forming lengths which are jointly disposed in meandering line form, each adjacent pair of parts being attached together by lateral flaps fixedly attached to each of said adjacent parts and in that each part, in the proximity of another adjacent part, is provided with an engaging member adapted removably to engage an upper terminal formation, with the engaging members of adjacent parts forming transverse alignments which are mutually separated by lengths of said transverse gap.

BRIEF DESCRIPTION OF THE DRAWINGS

Further advantages and features of the invention will be appreciated from the following description wherein there is given a preferred embodiment of the invention without any limiting intention and with reference to the accompanying drawings in which:

FIG. 6 is a part perspective view of the clamp, partly in section.

FIG. 7 is a part perspective view, on a larger scale, of the clamp, with two of the lateral flaps partly forced for separation thereof.

FIG. 8 is a perspective view of a clamp after separation.

DETAILED DESCRIPTION OF THE INVENTION

Figure 1:
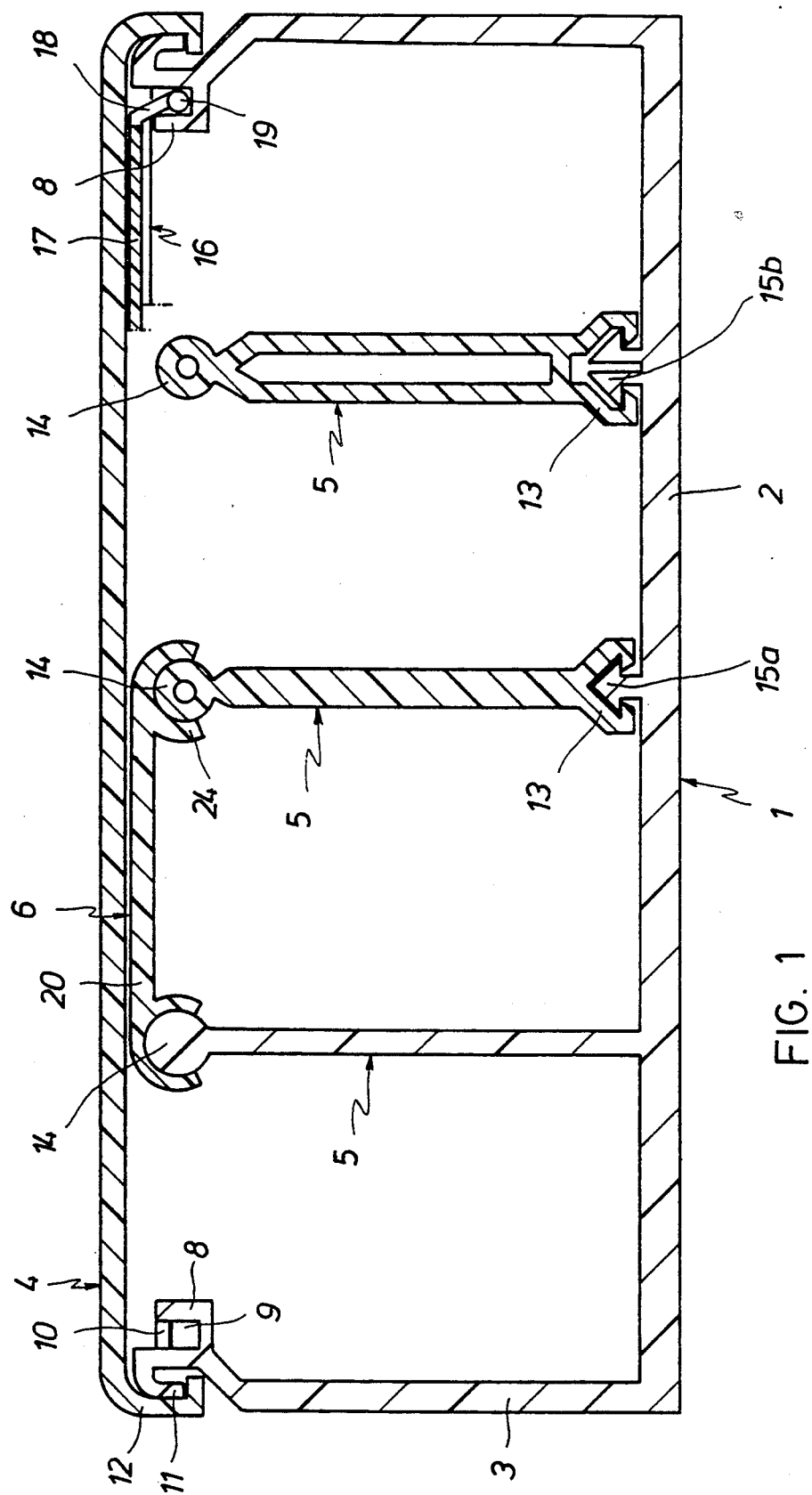
FIG. 1 is a cross-section view of a duct for electrical conductors provided with longitudinal partition members, a cover member and parts of stiffening clamps.

The invention is applicable to ducts 1 comprising a base wall 2 and two side walls 3 which may be covered by a cover member 4. Such ducts are appropriate for housing electrical, telephone, etc. cables which are randomly distributed according to needs in compartments separated by intermediate longitudinal partition members 5.

More particularly, the invention relates to the stiffening between walls 3 and/or partition members 5 by way of clamps 6. The walls are provided at the top end thereof with first coupling means which are preferably formed by the walls 3 being provided on the inner edge thereof with a tubular member 8, the hollow interior 9 of which is in communication at the top with the outside through apertures 10 which are preferably uniformly spaced apart. The cover member 4 is provided in a known way with flaps 12 having a reentrant edge which allows it to engage flanges 11 with which the side walls 3 are provided.

The intermediate partition members 5 are provided with a constant section terminal formation 14, which section is preferably convex and may be circular as shown in the Figures or may be polygonal. It is also contemplated that the terminal formation may be solid or hollow, like the partition member itself. In certain embodiments, the partition member is integral with the base wall 2 of the duct; in other cases the partition member 5 is provided at the bottom end with a jaw-like terminal means 13 which engages an arrow-headed member 15a or two nebs 15b placed back to back.

The clamp 6 is provided with second coupling means complementing said first means and the second means preferably consist of end parts 16 which in a known way have a thinner base portion 17 allowing them to bend easily to bring terminal legs 18 closer together. The force required for such bending is facilitated by flaps 25. Each of the legs 18 is provided with an external boss 19 which extend in opposite directions and are adapted for insertion in adjacent apertures 10 of the tubular members 8 situated on the inner edge of a side wall 3.

Figure 4:
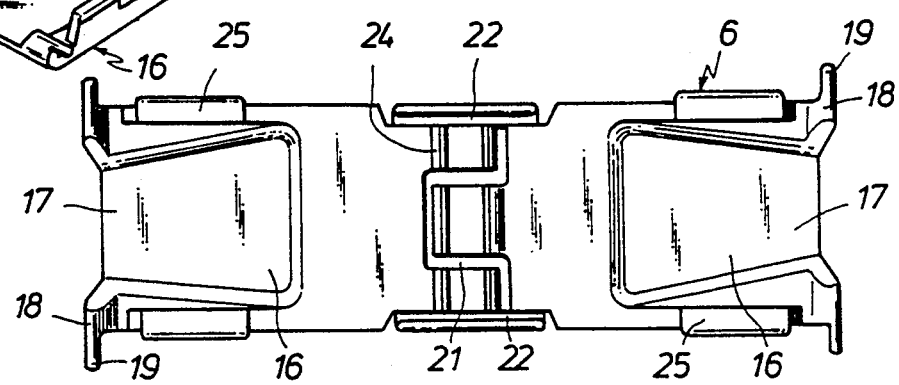
FIG. 4 is a plan view of a stiffening clamp formed only by two end parts.

The clamp 6 may comprise only two end parts 16 (FIG. 4) or may also have one or more intermediate parts 20 having a base portion 29. In all cases between two consecutive parts (whether they both be end parts 16, both be intermediate parts 20 or one end part 16 and one intermediate part 20) there is a transverse gap 21 forming lengths disposed in a meandering line, some of which obviously have a different orientation from the transverse direction.

Figure 3:
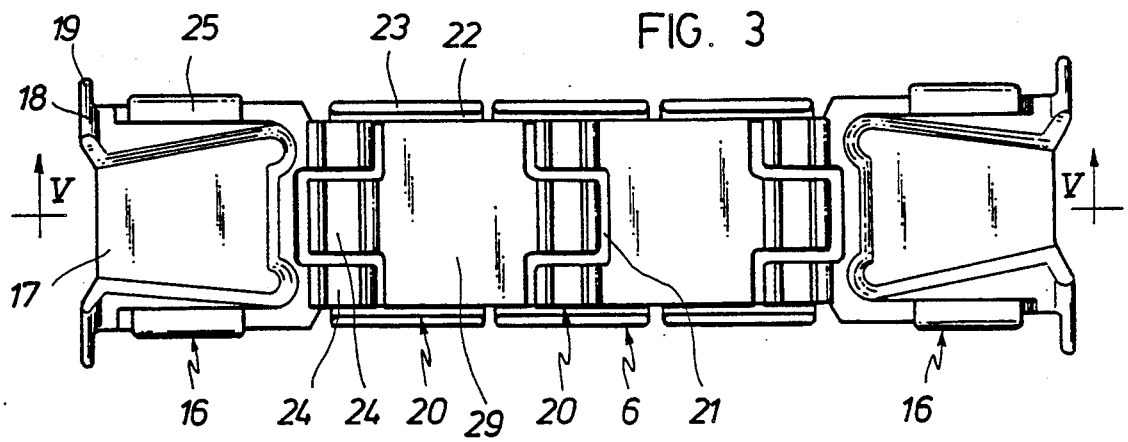
FIG. 3 is a plan view of the same clamp.
Figure 2:
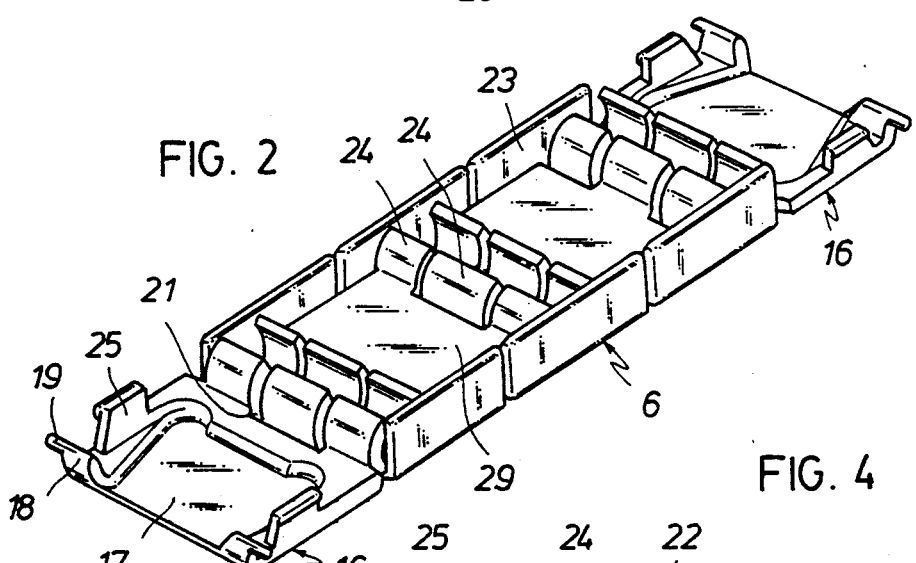
FIG. 2 is a perspective view of a stiffening clamp provided with intermediate parts.

Each adjacent pair of parts are rigidly joined together by lateral flaps 23 which are fixedly attached in turn to each of the adjacent parts 16, 20. Preferably across the attachment area there is a weakened portion such as a groove 22 (FIG. 3).

Figure 5:
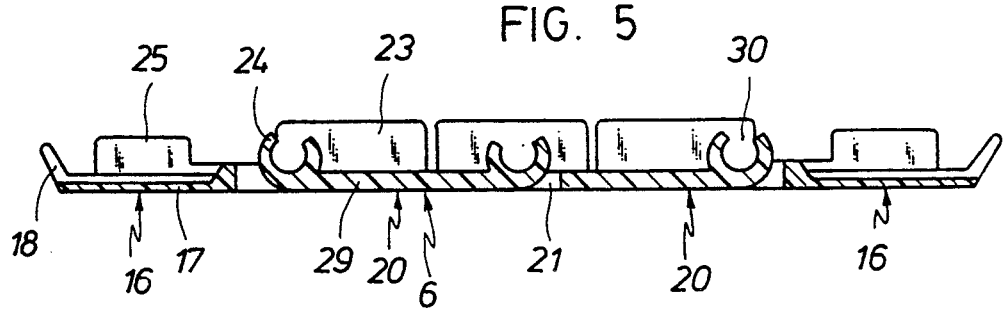
FIG. 5 is a cross-section view on the line V—V of FIG. 3.

Each part 16, 20 in the proximity of the other adjacent part is provided with at least one engagement member adapted to be removably attached to an upper terminal formation 14. Preferably the engagement members consist of a concave clip portion 24, adapted to engage a terminal formation 14 of an intermediate partition member 5 by embracing it retentively. The clip portions 24 of adjacent parts determine transverse alignments and are separated by lengths of the corresponding transverse gap 21. The section of he clip members conforms in shape and size to that of the terminal formations 14 and it is contemplated that the section, particularly the concave inner surface, be circular or polygonal and that the mouth 30 of the clip (FIG. 5) be narrower than the diametral size of the clip portion. Furthermore, the clip portion or clip portions of one part 16, 20 alternate with those of the adjacent part.

The clamp 6 may be used in the complete form thereof, whereby it extends across the side walls 3. As is known, an end part 16 of the clamp 6 is engaged with a side wall 3 by pressing the end part by the flaps 25, whereby the clamp is bent at the base 17, thereby drawing the bosses 19 closer together. In this way both bosses of one same end part may be inserted in consecutive apertures 10 and when the pressure is removed from the flap 25, the bosses 19 move farther apart, within the hollow interior 9, with the clamp being firmly held in place.

The clip portions 24 of the clamps are engaged with the terminal formations 14, which is possible because of the alignment defined by the clip portions of the two adjacent parts 16, 20.

When it is desired to use a clamp 6, either across two intermediate partition members 5, or across an intermediate partition member 5 and the side wall 3, in the first place a pair of flaps 23 are folded as shown by the arrows 31 in FIG. 7. In this way the flaps 23 are removed from the clamp 6 by yielding along the groove 22 thereby separating the adjacent parts 16, 20. Obviously this separation operation may be repeated for each pair of flaps until all parts 16, 20 are separated one by one.

Figure 9:
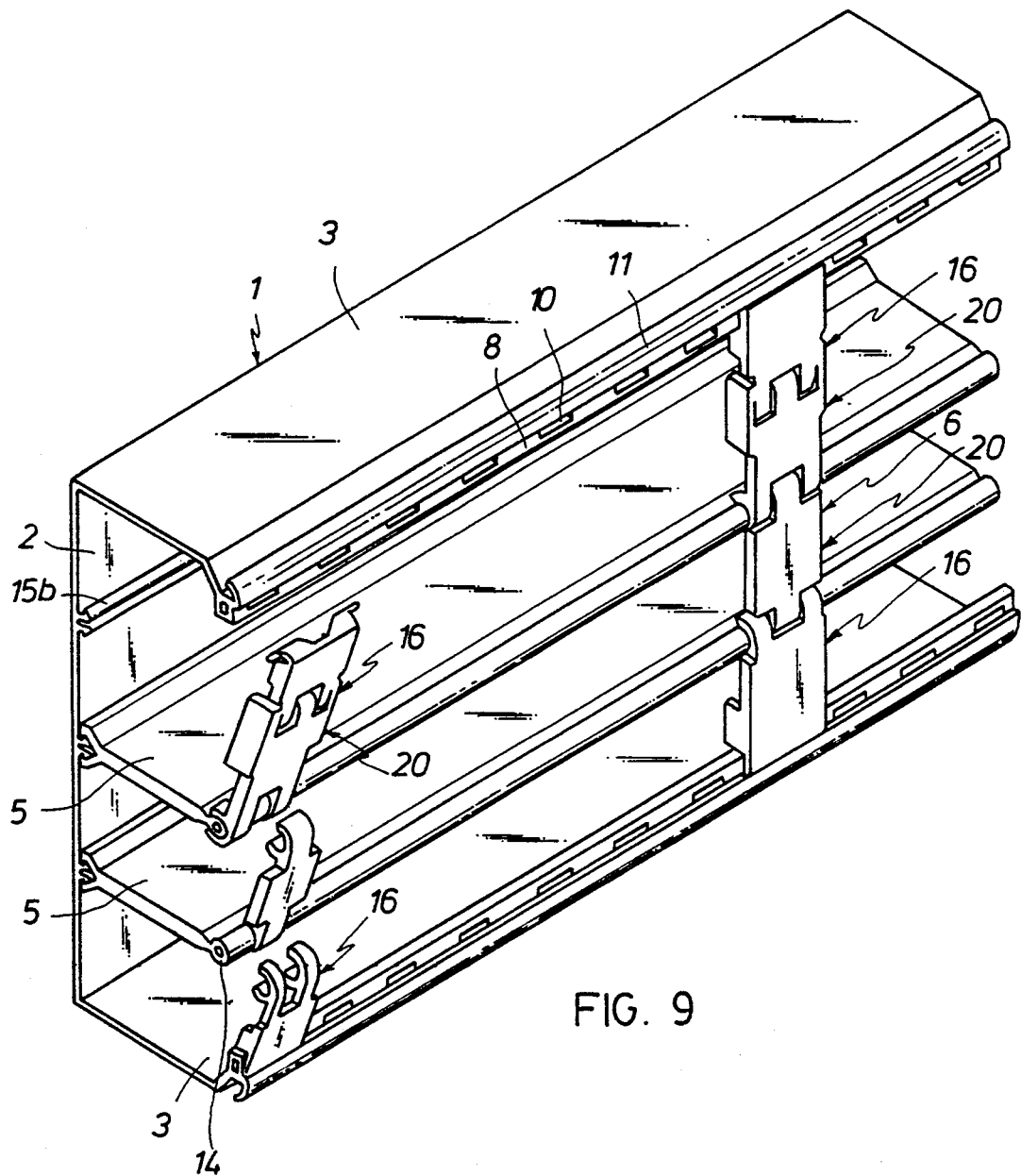
FIG. 9 is a perspective view of a duct having clamps mounted thereon.

Several ways of using the clamps 6 are shown in FIG. 9, either as a whole or by individual parts 16, 20. These parts may be used either individually or grouped together by pairs, in threes or fours as shown in the example.

In view of he constructive and utilization features of the clamps 6, the advantages achieved in comparison with the commonly used similar articles should be highlighted. From the constructive point of view, the basic advantage is the fact that a single type of clamp is obtained for all the requirements thereof in the ducting. From a practical point of view, a further advantage is the fact that the fitters do not have to stock themselves with a particular number of different loose parts, since the parts required for each operation are segregated from the whole clamps, which allows the clamps to be used whole or in fragments as desired. Furthermore, the clamps or loose part thereof may be easily coupled together with adequate rigidity.

It should particularly be borne in mind that the places where these clamps are to be installed are usually hard to get at, frequently requiring the use of stepladders or other means of access. Therefore, the persons making the installation with their own hands value the fact that they do not have to encumber themselves with a variety of different pieces.

What I claim is:

1. In a ducting for electrical conductors and the like with a stiffening arrangement, the ducting being of the type comprising a base wall; two side walls having the top ends thereof provided with first coupling means; and intermediate longitudinal partition members each provided with an upper terminal formation; and the stiffening arrangement comprising stiffening clamps provided at the ends thereof with second coupling means engageable with said first coupling means; the improvement wherein said upper terminal formations have a constant section and each stiffening clamp comprises at least two parts, such that between every two adjacent parts there is a transverse gap forming lengths which are jointly disposed in meandering line form, each adjacent pair of parts being attached together by lateral flaps fixedly attached to each of said adjacent parts and in that each part, in the proximity of another adjacent part, is provided with at least one engaging member adapted removably to engage an upper terminal formation, with the engaging members of adjacent parts forming transverse alignments which are mutually separated by portions of said transverse gap.

2. The combination of claim 1, wherein said first coupling means comprise spaced apart apertures situated in the upper portion of a tubular member formed on an inner edge of the side walls, and said second coupling means comprise a pair of oppositely extending bosses adapted for insertion in said apertures.

3. The combination of claim 1, wherein said upper terminal formations are of convex shape and said engaging members comprise a concave clip portion adapted retentively to surround a convex upper terminal formation.

4. The combination of claim 3, wherein in each alignment of clip portions, the clip portions of one part and the clip portions of the adjacent part alternate.

5. The combination of claim 4, wherein each pair of alternate clip portions are separated by a stretch of said transverse gap.

6. The combination of claim 3, wherein the cross-sections of said terminal formations and of said clip portions are circular.

7. The combination of claim 3, wherein the cross-sections of said terminal formations and of said clip portions are polygonal.

8. The combination of claim 1, wherein each stiffening clamp comprises only two end parts.

9. The combination of claim 1, wherein each stiffening clamp comprises two end parts and at least one intermediate part.

10. The combination of claim 1, wherein said lateral flaps and said parts are connected across a weakened portion.

11. A stiffening clamp for ducting for electrical conductors and the like, the ducting being of the type comprising a base wall; two side walls each of which is provided with an inner edge having a tubular member provided at the top thereof with spaced apart apertures; and intermediate longitudinal partition members each provided with an upper terminal formation; said clamp having end parts each of which is provided with a pair of oppositely extending bosses adapted to be inserted in said apertures, said clamp being generally flat, rigid and elongate and adapted to extend transversally across the inner edges of both side walls; said clamp further comprise at least two pars so that between each pair of adjacent parts there is a transverse gap forming lengths which are jointly disposed in meandering line form, each adjacent pair of parts being attached together by lateral flaps fixedly attached to each of said adjacent parts; and each part, in the proximity of another adjacent part being provided with a clip portion adapted retentively to surround an upper terminal formation, with the clip portions of adjacent parts forming transverse alignments, which are mutually separated by lengths of said transverse gap.

* * * * *